United States Patent [19]

Yamanishi et al.

[11] Patent Number: 4,761,690
[45] Date of Patent: Aug. 2, 1988

[54] VIDEO TAPE RECORDER WITH PARTICULAR FORMAT CHROMINANCE AND LUMINANCE INFORMATION

[75] Inventors: Kazuhiro Yamanishi, Higashiosaka; Masaaki Kobayashi, Kawanishi; Akihiro Takeuchi, Ikoma; Atsuo Ochi, Kadoma; Yoshitomi Nagaoka, Neyagawa, all of Japan

[73] Assignee: Matsushita Electric Industrial Co., Ltd., Kadoma, Japan

[21] Appl. No.: 902,957

[22] Filed: Sep. 2, 1986

[30] Foreign Application Priority Data

Sep. 5, 1985 [JP] Japan .................................. 60-196296
Oct. 18, 1985 [JP] Japan .................................. 60-233635

[51] Int. Cl.⁴ ........................ H04N 9/79; H04N 9/84
[52] U.S. Cl. .................................. 358/310; 358/330; 358/328; 360/33.1
[58] Field of Search ................. 358/310, 328, 330; 360/33.1

[56] References Cited

U.S. PATENT DOCUMENTS 3,911,483 10/1975 Kihara et al. .................... 360/33.1
4,012,771 3/1977 Ishigaki et al. .................. 358/328
4,290,082 9/1981 Hirai ........................... 360/33.1 X
4,419,698 12/1983 Shiraishi et al. ................... 358/330

FOREIGN PATENT DOCUMENTS 58-131885 8/1983 Japan .
59-4279 1/1984 Japan .
59-34785 2/1984 Japan .
59-104886 6/1984 Japan .
59-104887 6/1984 Japan .

Primary Examiner—Robert L. Richardson
Attorney, Agent, or Firm—Wenderoth, Lind & Ponack

[57] ABSTRACT

A video tape recorder which records video signals on a magnetic tape in such a manner that a first signal having luminance information and a second signal having chrominance information are recorded alternately on each track and the first signal recorded on each track is adjacent to the first signal recorded on an adjacent track and the second signal recorded on each track is adjacent to the second signal recorded on the adjacent track. The first signal and the second signal are exchanged every predetermined period L to obtain two combined signals each composed of the first and second signals which occur alternately at intervals of the predetermined period L.

9 Claims, 9 Drawing Sheets

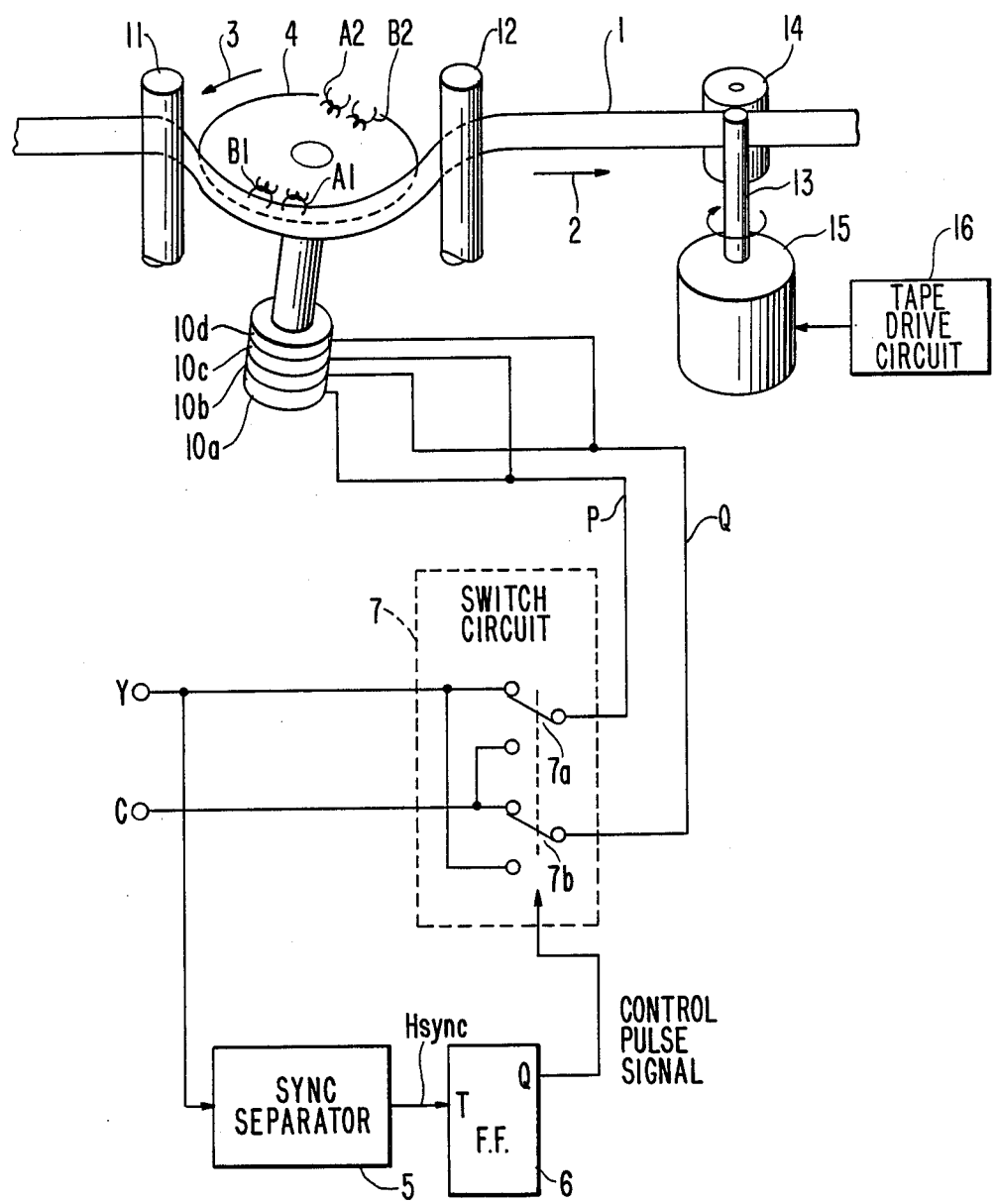

VIDEO TAPE RECORDER WITH PARTICULAR FORMAT CHROMINANCE AND LUMINANCE INFORMATION

BACKGROUND OF THE INVENTION

1. Field of the Invention

This invention relates to a video tape recorder for recording video signals on a magnetic tape.

2. Description of the Prior Art

Conventional video tape recorders record video signals on a magnetic tape in such a manner that FM luminance signal Y and FM chrominance signal C are recorded on separate tracks which are arranged alternately in the order of Y, C, Y, C, Y, C, . . . . The FM luminance signal is a frequency-modulated luminance signal. The FM chrominance signal is a signal which is obtained by time-base-compression-multiplexing two chrominance difference signals and frequency-modulating the multiplexed signal, or a signal which is obtained by frequency-modulating two chrominance difference signals with different carrier frequencies and mixing the frequency-modulated signals (so-called frequency-division-multiplexed signal), or a signal which is obtained by frequency-modulating a so-called line sequential chrominance difference signal which is composed of two chrominance difference signals which appear alternately at a cycle of one horizontal scanning period. These are shown in Japanese Laid-Open patent applications (Kokai) Nos. 59-4279, 59-34785, 58-131885, 59-104886 and 59-104887.

In these conventional video tape recorders, a guard band on which no signals are recorded must be provided between each adjacent Y track and C track so that the FM luminance signal Y and the FM chrominance signal C do not interfer with each other. Therefore, the recording density cannot be increased adequately.

Slant azimuth recording is known to increase the recording density. The gaps of the recording heads for scanning adjacent tracks are tilted to have different angles from each other so that a crosstalk component from an adjacent track is attenuated due to azimuth loss. However, this method is effective only when there is a corelatior between the signals recorded on adjacent tracks. When a crosstalk is caused in a FM signal, the influence of the crosstalk increases in proportion to the frequency difference from the carrier frequency (according to the principle of triangular noise). In other words, the crosstalk components having frequencies far different from the carrier frequency cause large interferences. Since there is no corelatior between luminance signal and chrominance signal, the crosstalk from the adjacent track cannot be reduced by the slant azimuth recording.

SUMMARY OF THE INVENTION

An object of the present invention is to provide a video tape recorder capable of recording video signals on a magnetic tape with no guard bands thereby to realize a high density recording of video signal.

More specifically, the object of the present invention is to provide a video tape recorder which records video signals on a magnetic tape in such a manner that a first signal having luminance signal information and a second signal having chrominance signal information are recorded alternately on each track and that the first signal recorded on each track is adjacent to the first signal recorded on an adjacent track and the second signal recorded on the each track is adjacent to the second signal recorded on the adjacent track.

In order to achieve the above object, the video tape recorder of the invention comprises: means for exchanging the first signal and the second signal every predetermined period L to obtain two combined signals each composed of the first and second signals which occur alternately at intervals of the predetermined period L, two pairs of rotary magnetic heads for recording the two combined signals on a magnetic tape so as to form signal tracks with no spaces between each adjacent two of the signal tracks; and means for moving the magnetic tape so that a track of one field is shifted from a track of next field by a predetermined distance $\alpha$. Two heads of each pair are disposed to be apart by a predetermined distance S in the head rotating direction. Each of the two heads of one pair is apart by 180° in the head rotating direction from corresponding one of two heads of the other pair. In order to make the first signals recorded on each two adjacent tracks to be adjacent to each other and the second signals recorded on the each two adjacent tracks to be adjacent to each other, the values of the period L, distance S and distance $\alpha$ are selected as follows:

$$L = kH$$

$$S = (2n-1)L$$

$$\alpha = (i/2)L, \ i = 2m - 1$$

where

H: horizontal scanning period;

k, n, i, m: arbitrary integer.

In this condition, the order of the first signal and the second signal on the tracks reverses every frame. It is preferable that the order does not change on all of the tracks. In this case, the distance $\alpha$ is selected as:

$$\alpha = (i/2)L, \ i = 2m$$

In this case, the two pair of heads are slightly shifted by a predetermined distance from the position apart by 180° from each other, or the signals are delayed by a predetermined time every other frame.

The number of horizontal lines in one frame in the NTSC system or PAL system is not an even number - one frame is composed of 525H in the NTSC system, and of 625H in the PAL system. Therefore, if the first and second signals are exchanged every period L, the order of the signals in one frame and that in the next frame are reversed to each other. To avoid this, the signal exchange operation may be initialized every frame, or the exchanged signals may be further exchanged every frame. The initialization is preferably performed during a vertical blanking period.

Since the adjacent signals recorded on the adjacent tracks are same in kind, or have a strong correlation, the slant azimuth recording can be effectively employed in the video tape recorder of the invention.

The above and other objects and features of the invention will become more apparent from the following description taken in connection with the accompanying drawings in which:

BRIEF DESCRITION OF THE DRAWINGS

FIG. 2 is a schematic block diagram showing an embodiment of the video tape recorder of the invention for realizing the track pattern of FIG. 1;

Figure 1:
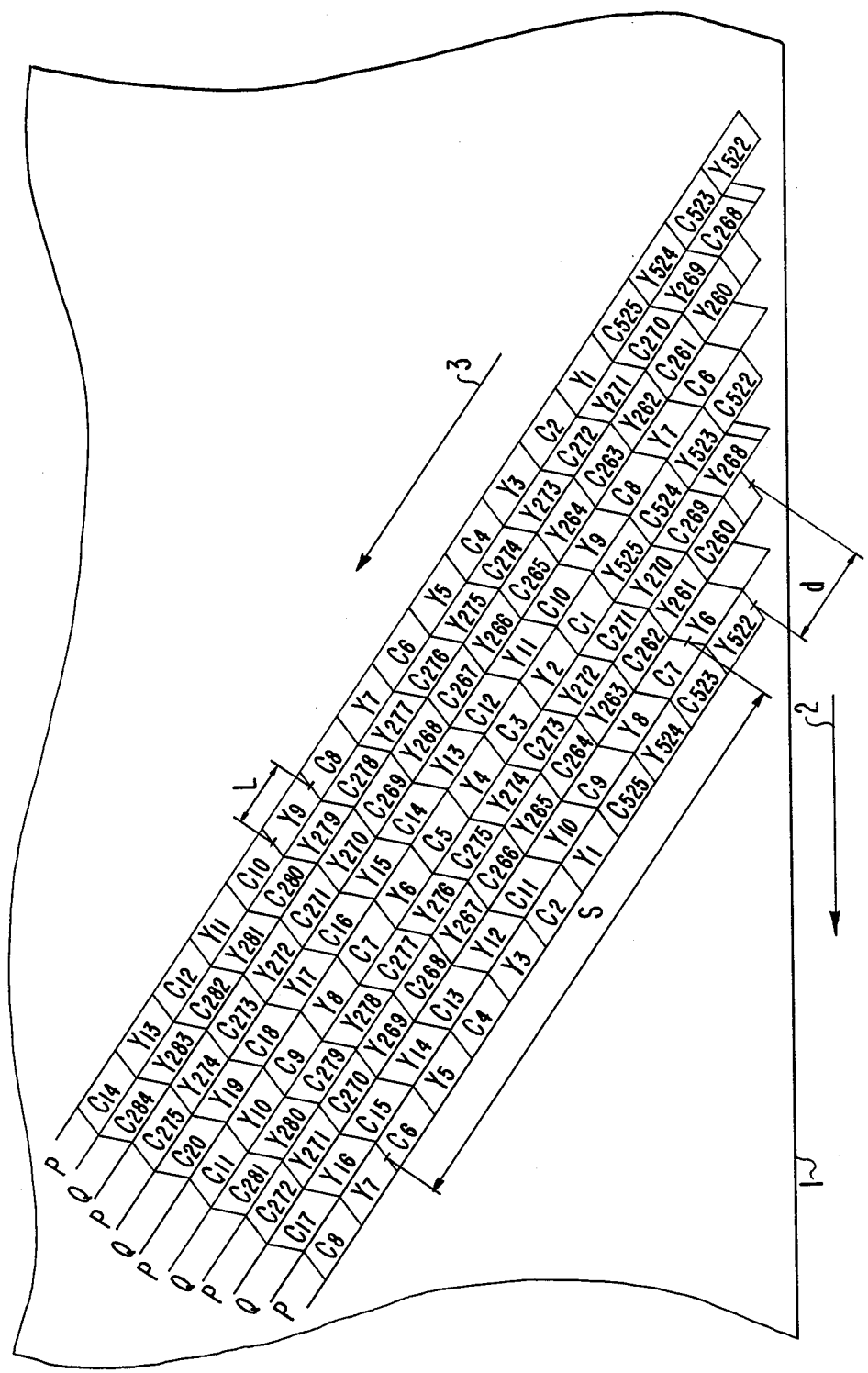
FIG. 1 is a track pattern diagram showing an example of signal track pattern on a magnetic tape according to the invention.
Figure 3A:
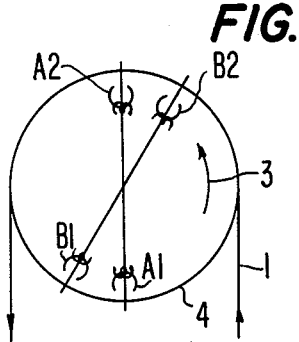
Figure 8A:
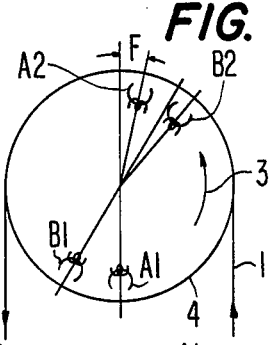
Figure 11:
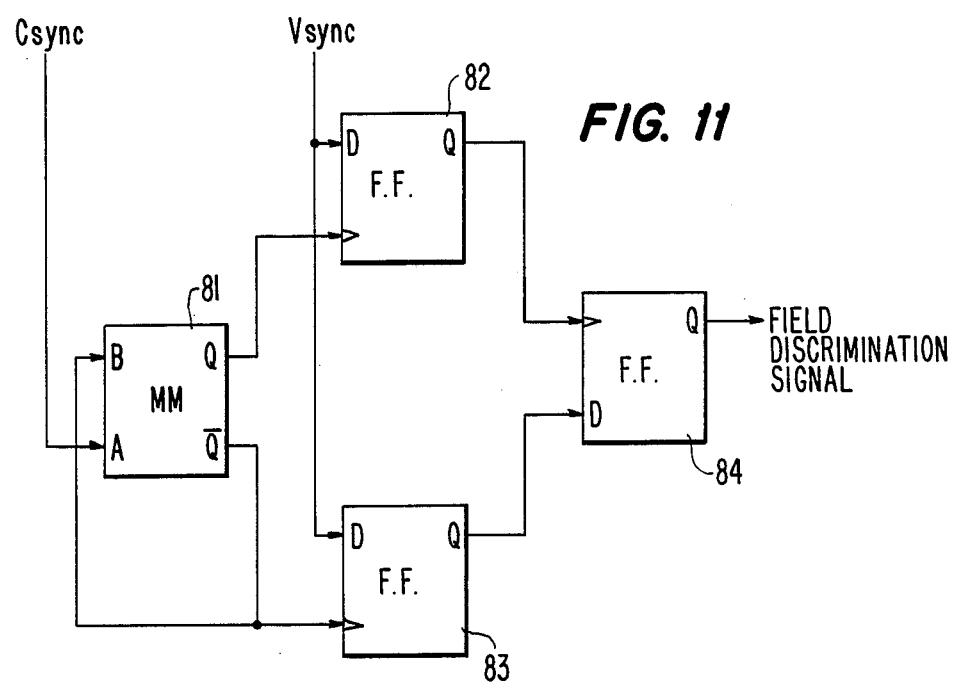
Figure 5A:
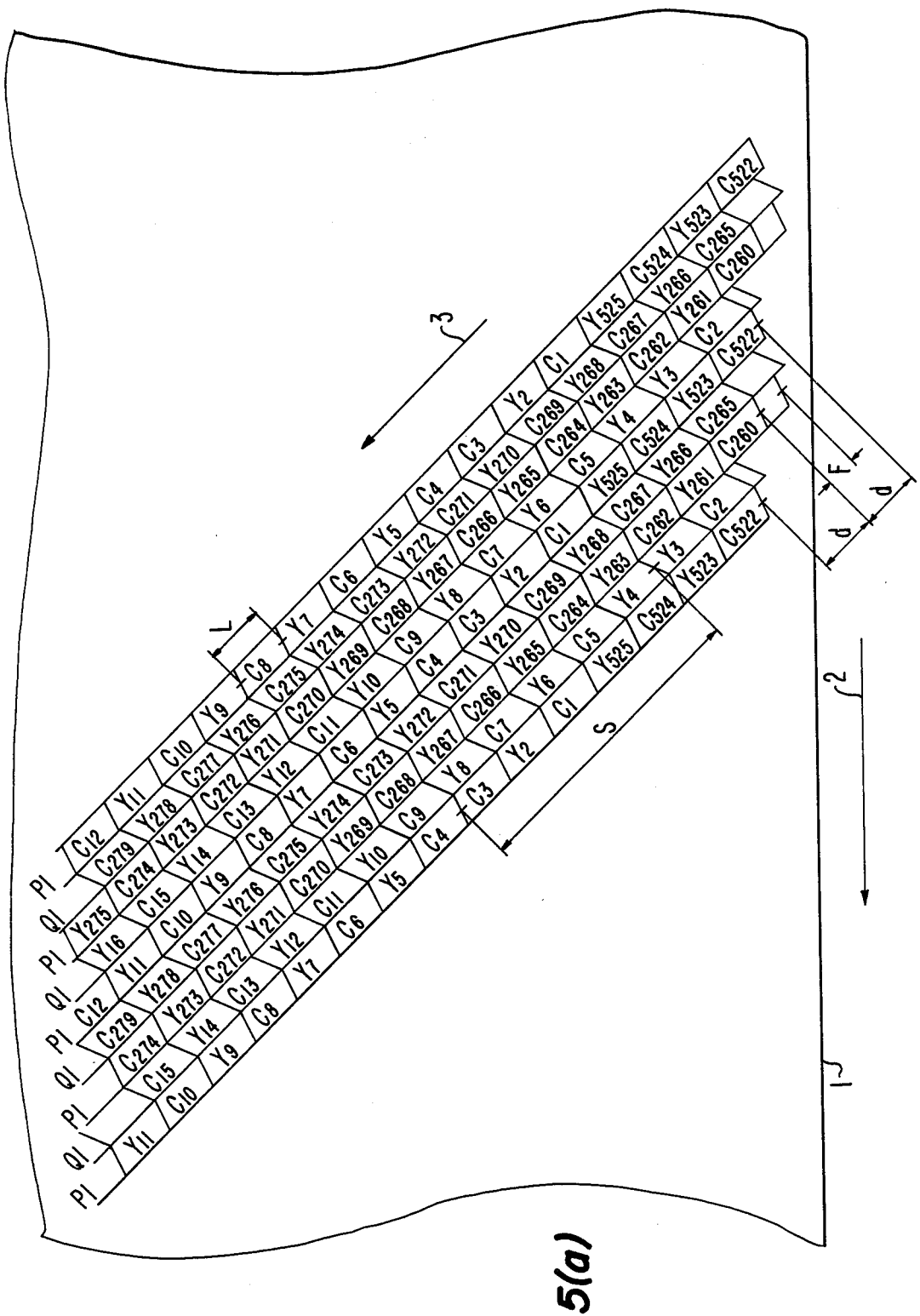
Figure 5B:
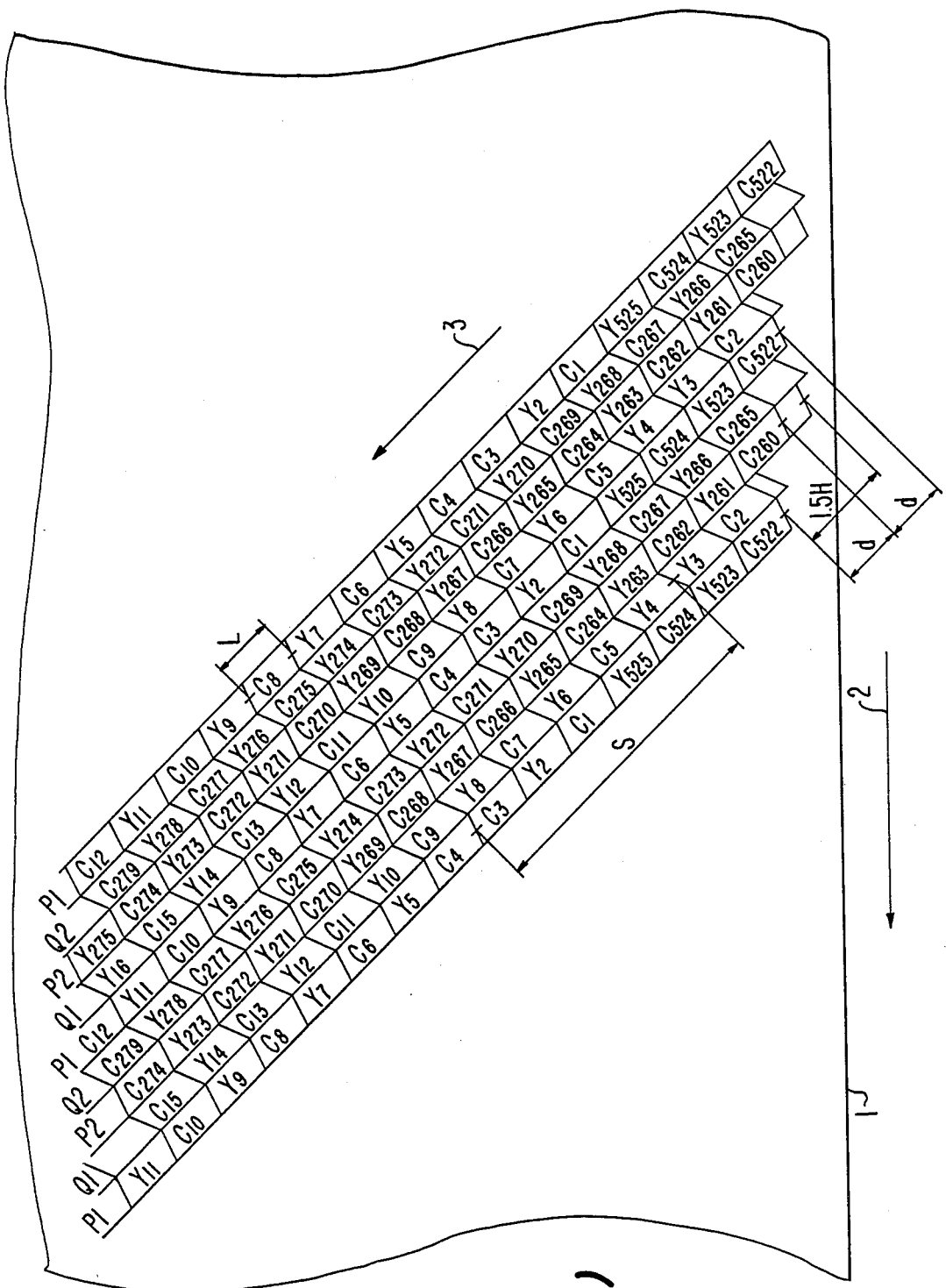
Figure 7:
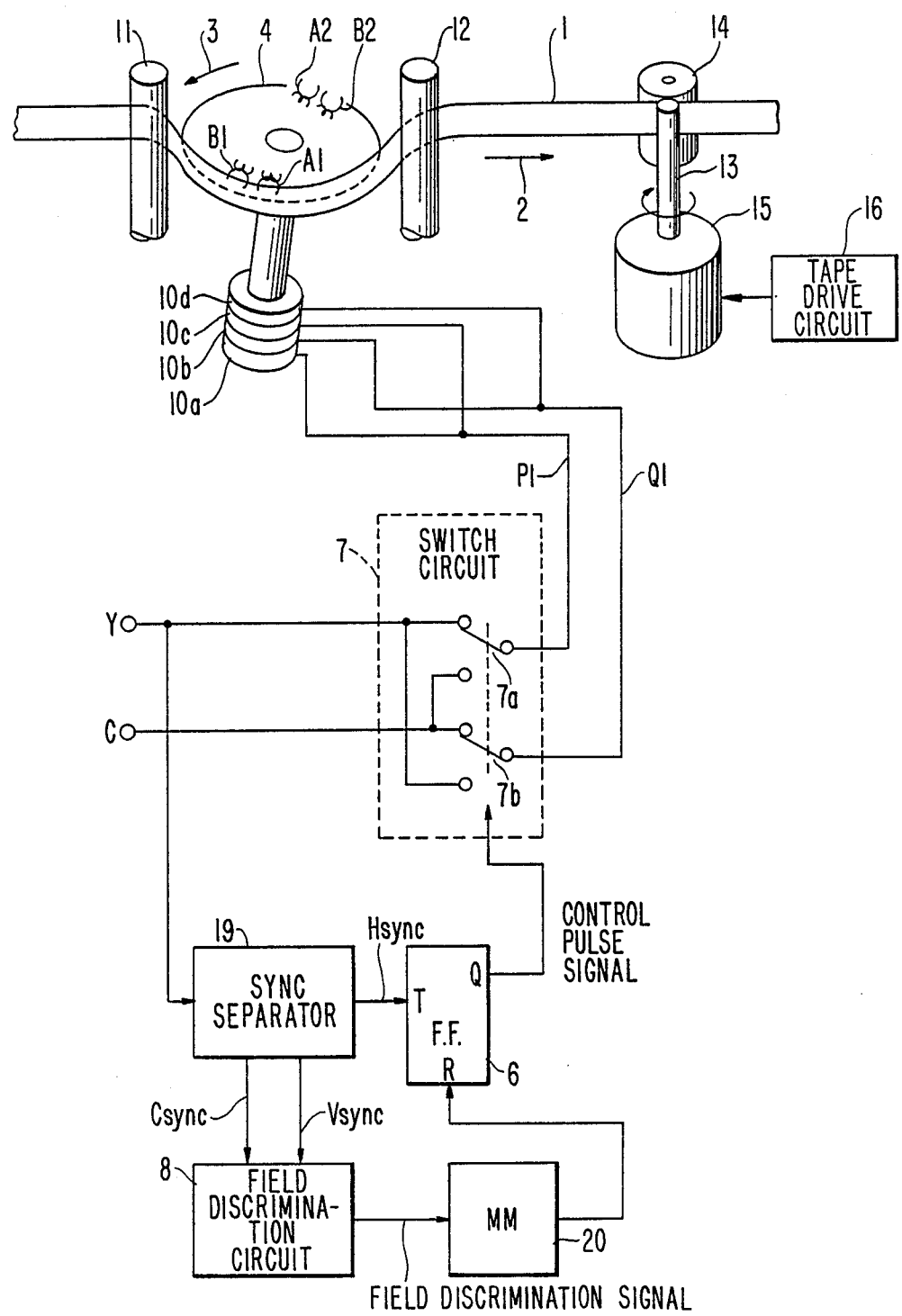
Figure 9:
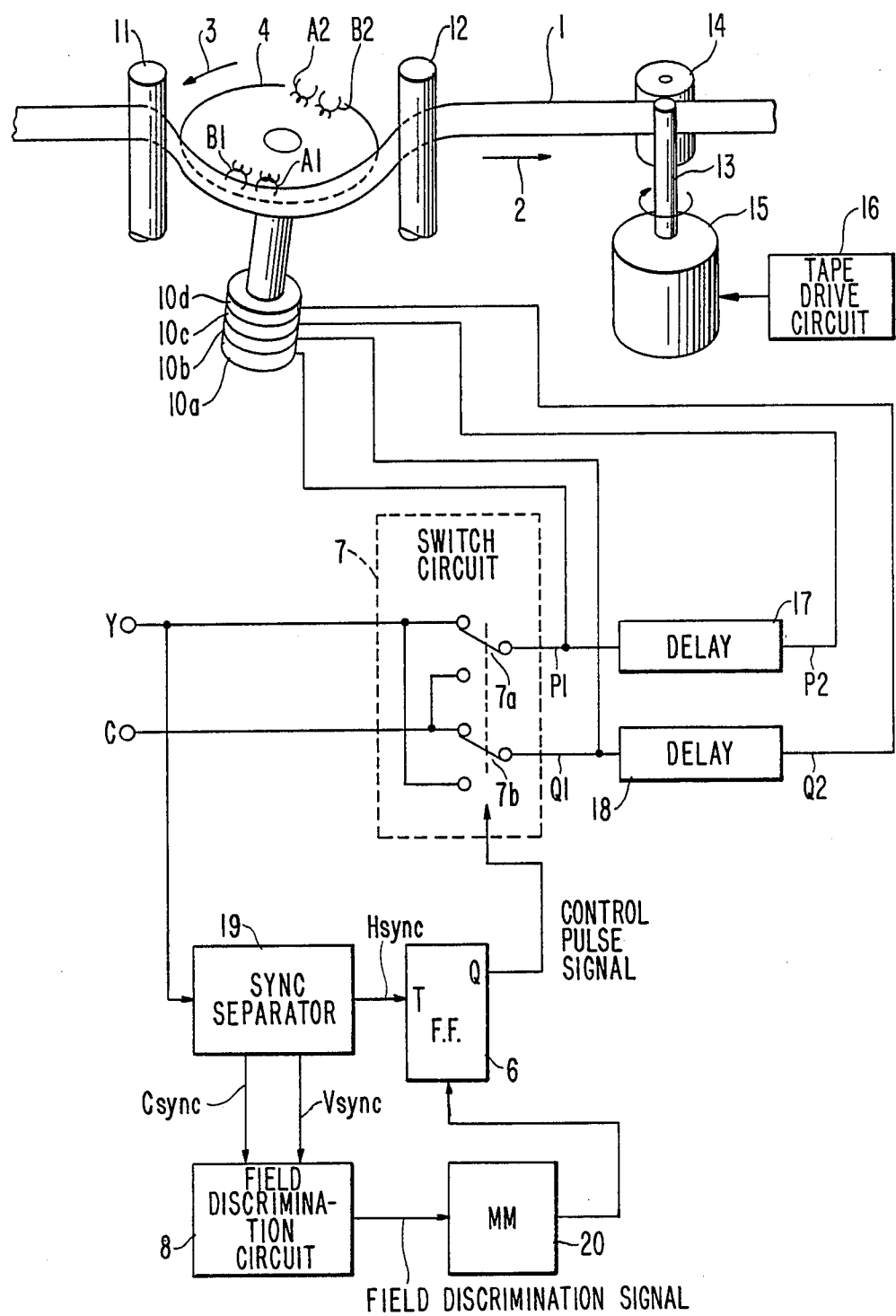
Figure 10:
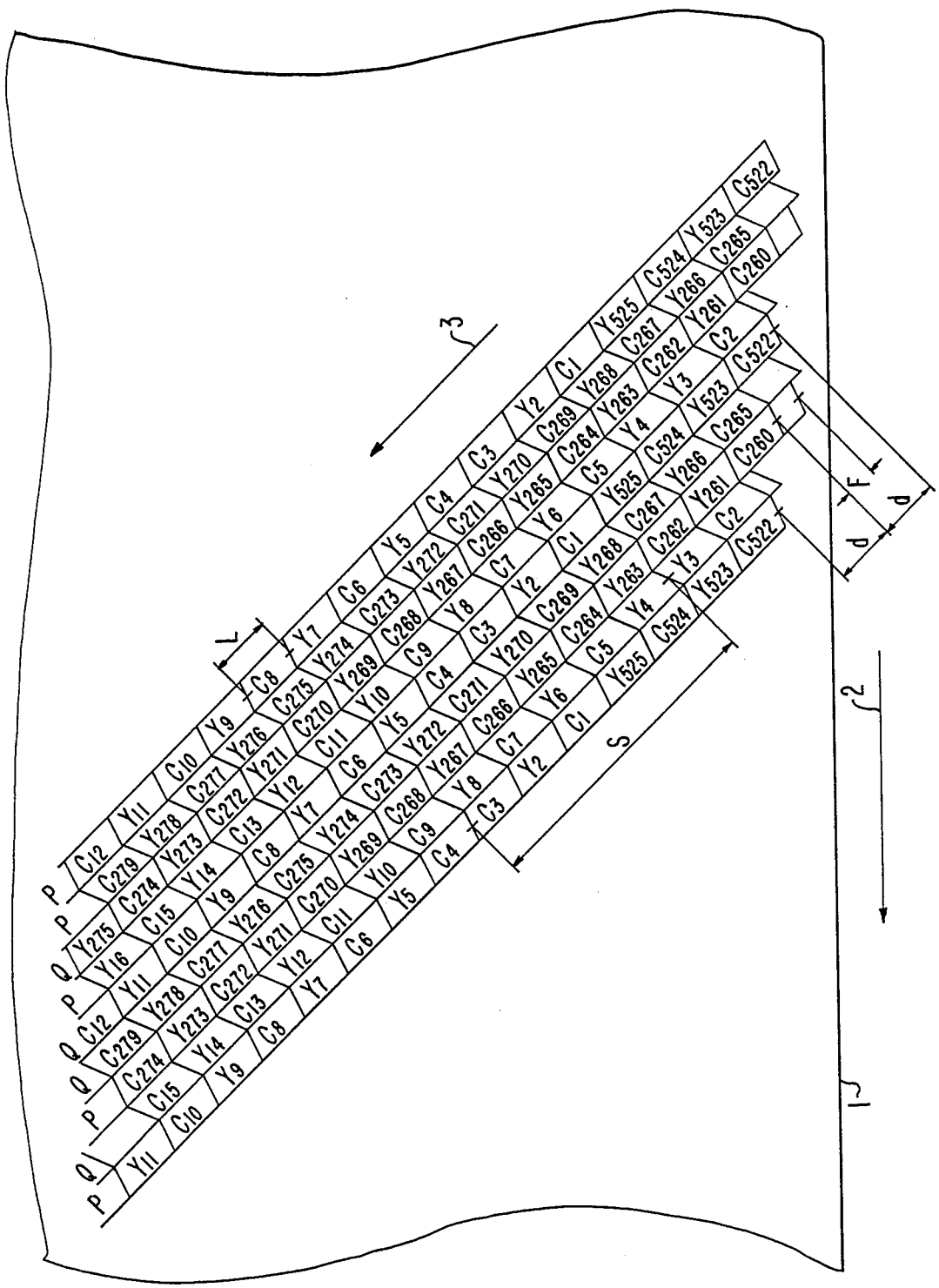

FIGS. 3(a) and (b) are schematic diagrams showing an arrangement of rotary magnetic heads for realizing the track pattern of FIG. 1;

Figures 4, 6:
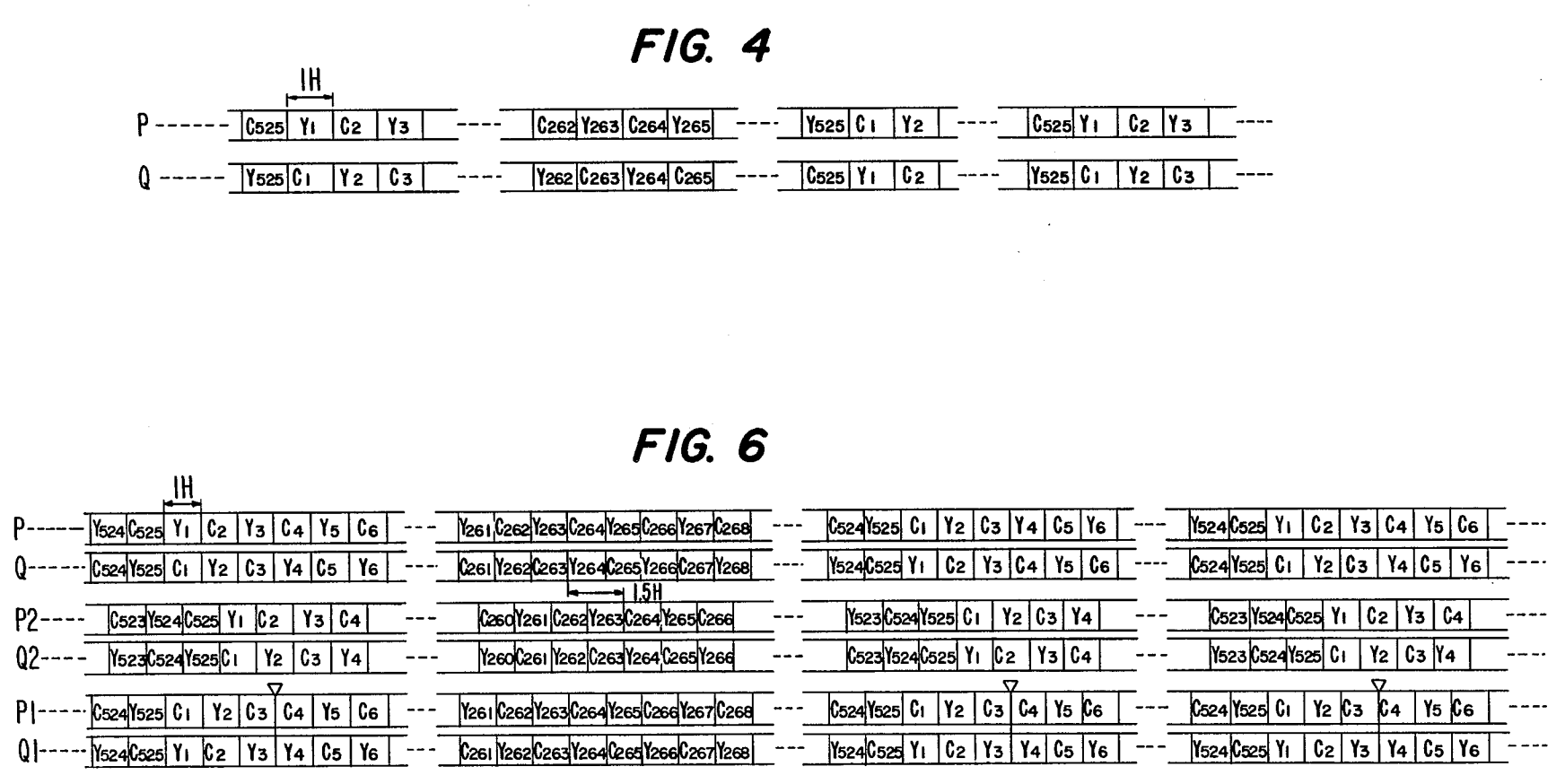

FIG. 4 is a signal sequence diagram showing signals recorded in the pattern of FIG. 1;

FIGS. 5(a) and (b) are track pattern diagrams showing another example of signal track pattern on a magnetic tape according to the invention;

FIG. 6 is a signal sequence diagram showing signals recorded in the patterns of FIGS. 5(a) and (b);

FIG. 7 is a schematic block diagram showing another embodiment of the video tape recorder of the invention for realizing the track pattern of FIG. 5(a);

FIGS. 8(a) and (b) are schematic diagram showing another arrangement of rotary magnetic heads used in the embodiment of FIG. 7;

FIG. 9 is a schematic block diagram showing still another embodiment of the video tape recorder of the invention for realizing the track pattern of FIG. 5(b);

FIG. 10 is a track pattern diagram showing a further example of signal track pattern on a magnetic tape according to the invention; and FIG. 11 is a circuit diagram showing an example of field discrimination circuit used in the embodiments of FIGS. 7 and 9.

DESCRIPTION OF THE PREFERRED EMBODIMENTS

FIG. 1 shows a track pattern on a magnetic tape formed according to the present invention. A magnetic tape 1 moves in a direction indicated by an arrow 2. Rotary magnetic heads (not shown) scan the tracks in a direction indicated by an arrow 3. Symbols Y and C indicate a first signal having luminance signal information and a second signal having chrominance signal information, respectively, and the suffix indicates a horizontal line number. Each adjacent two tracks are recorded by magnetic heads having different azimuths from each other. Each Y recorded section on each track is adjacent to a Y recorded section on an adjacent track, and each C recorded section on each track is adjacent to a C recorded section on an adjacent track. The tracks are arranged without any guard band between any adjacent two tracks. Symbol L indicates a period for exchanging Y and C signals, i.e., a length of each Y or C recorded section. A pair of magnetic heads are disposed to be apart by a distance S from each other in the direction 3, or the rotating direction of the magnetic heads. Symbol $\alpha$ indicates a shift amount of a track of one field from a track of the previous field. L, S and $\alpha$ are determined to satisfy the following relations:

$$\left. \begin{array}{l} L = kH \\ S = (2n-1)kH \\ \alpha = (i/2)kH \end{array} \right\} \quad (1)$$

where

H: horizontal scanning period; and k, n, i: any integer.

In the track pattern of FIG. 1, k=1, n=5 and i=3, or L=1H, S=9H and $\alpha$=1.5H.

When the number of horizontal lines in a field is 262.5H or 312.5H, i.e., has an incomplete line 0.5H, a same kind signal is recorded on a section of one track and an adjacent section of an adjacent track if the relations (1) are satisfied.

The first signal is a frequency-modulated luminance signal. The second signal may be a signal which is obtained by time-base-compression-multiplexing two chrominance difference signals and frequency-modulating the multiplexed signal, or a signal which is obtained by frequency-modulating two chrominance difference signals with different carrier frequencies and mixing the frequency-modulated signals (so-called frequency-division-multiplexed signal), or a signal which is obtained by frequency-modulating a so-called line sequential chrominance difference signal which is composed of two chrominance difference signals which appear alternately at a cycle of one horizontal scanning period.

FIG. 2 shows a schematic block diagram of an embodiment of video tape recorder for realizing the track pattern of FIG. 1, and FIGS. 3(a) and (b) show an arrangement of two pairs of rotary magnetic heads of the video tape recorder of FIG. 2.

Referring to FIG. 2, an input first signal Y and an input second signal C are exchanged with each other by a switch circuit 7 to be two combined signals P and Q each composed of Y and C which occur alternately. The switch circuit 7 comprises two changeover switches each of which is controlled by a periodic control pulse signal to alternately select first and second input terminals thereof. The first signal Y is applied to the first input terminal of the changeover switch 7a and the second input terminal of the changeover switch 7b, and the second signal C is applied to the first input terminal of the changeover switch 7b and the second input terminal of the changeover switch 7a.

The control pulse signal is produced by a synchronizing signal separation circuit (SYNC SEPARATOR) 5 and a flip-flop 6. The synchronizing signal separation circuit 5 separates horizontal synchronizing signals from the input first signal Y. The flip-flop 6 is responsive to the horizontal synchronizing signals applied to a trigger input T thereof for producing the control pulse signal at an output terminal Q thereof. Thus, each of the changeover switches 7a and 7b is changed over at intervals of 1H, whereby in each of the combined signals P and Q the signals Y and C occur alternately at the intervals of 1H as shown in FIG. 4.

The combined signal P is applied to rotary transformers 10a and 10c mounted on a rotary shaft of a rotary disk 4 which mounts thereon two pairs of rotary magnetic heads A1, B1 and A2, B2, and the combined signal Q is applied to rotary transformers 10b and 10d mounted on the same rotary shaft. The rotary transformers 10a, 10b, 10c and 10d are respectively connected to the rotary magnetic heads A1, B1, A2 and B2.

The magnetic tape 1 is driven by a capstan 13 and a pinch roller 14 to move in the direction 2. Guide posts 11 and 12 guide the magnetic tape 1 to be wound on the rotary disk 4 in an angle of 180° as well-known. The capstan 13 is driven by a motor 15. The speed of the motor 15 is controlled by a tape drive circuit 16 which is also well-known.

Figure 3B:
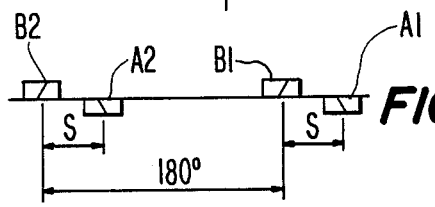

Referring to FIG. 3(a) which shows a top view of the arrangement of the magnetic heads on the rotary disk (or cylinder) 4, the heads A1 and A2 are apart by 180° from each other and the heads B1 and B2 are apart by 180° from each other. Referring to FIG. 3(b) which shows the arrangement of the magnetic heads in the rotational direction thereof, the pair of heads A1 and B1 are apart by S from each other and the pair of heads A2 and B2 are also apart by S from each other. The heads A1 and A2 have a same azimuth, and the heads B1 and B2 have another same azimuth which is different from that of the head A1 or A2.

The rotary disk 4 turns a half (180°) in a time corresponding to one field, during which the magnetic tape is moved for the distance α corresponding to two tracks in the direction 2. During a first half (180°) turn of the rotary disk 4, the first pair of magnetic heads A1 and B1 scan the magnetic tape 1 to record the first and second signals included in a first field in each frame, and during a second half (180°) turn (next to the first half turn) of the rotary disk 4 the second pair of magnetic heads A2 and B2 scan the magnetic tape 1 to record the first and second signals in a second field in each frame, thus completing recording of the signals in one frame.

In the way as described above, the two combined signals P and Q are recorded on the magnetic tape 1 in the pattern as shown in FIG. 1.

In a video tape recorder in which the rotational direction of the heads or the moving direction of the tape is opposite to that of FIG. 2, the same effect as the above can be obtained by applying the signal P to the heads A1 and B2 through the rotary transformers 10a and 10d, respectively, and the signal Q to the heads B1 and A2 through the rotary transformers 10b and 10c, respectively.

In the track pattern shown in FIG. 1, however, the order of the signals Y and C is reversed every frame, from the order of Y, C, Y, C, ... to the order of C, Y, C, Y, ... or vice versa. It is preferable to make same the order of the signals Y and C in every frame when the editing is considered. This can be realized selecting an even number as the value i by the embodiment which will be described below.

FIGS. 5(a) and 5(b) show another track pattern according to the invention, in which the signals Y and C are recorded in the same order in every frame. Here, k=1, n=3 and i=2, or L=1H, S=5H and α=1H in the relations (1). The value of i may be any other even number.

FIG. 6 shows combined signals P1, Q1 and P2, Q2 recorded in the pattern shown in FIGS. 5(a) and 5(b). Combined signals P and Q shown in FIG. 6 are the same as those shown in FIG. 4. The combined signals P2 and Q2 are delayed by 1.5H from P and Q, respectively. The combined signals P1 and Q1 are initialized as to the exchanging timing at a timing (at the beginning of forth horizontal scanning period) indicated by a symbol ▽ to be equal to P and Q, respectively.

Figure 8B:
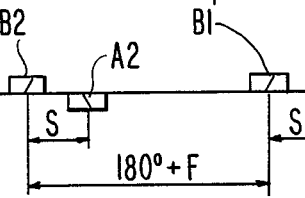

FIG. 7 shows another embodiment of a video tape recorder for realizing the track pattern shown in FIG. 5(a) with a head arrangement as shown in FIGS. 8(a) and 8(b). The configuration of FIG. 7 is different from that of FIG. 2 in the circuit for producing the periodic control pulse signal applied to the switch circuit 7. Referring to FIG. 7, a synchronizing signal separation circuit (SYNC SEPARATOR) 19 separates composite synchronizing signals $C_{sync}$ from the input first signal Y and produces horizontal synchronizing signals $H_{sync}$ and vertical synchronizing signals $V_{sync}$. A field discrimination circuit 8 produces a field descrimination signal which is "high" during an odd field and "low" during an even field from the signals $C_{sync}$ and $V_{sync}$. A monostable multivibrator (MM) 20 is responsive to a leading edge of the field descrimination signal for producing reset pulses at intervals of a frame. The flip-flop 6 is responsive to the horizontal synchronizing signals $H_{sync}$ and reset by the reset pulses at the intervals of a frame for producing periodic control pulse signal which is initialized at the intervals of a frame. The switch circuit 7 controlled by such control pulse signal produces two combined signals P1 and Q1 as shown in FIG. 6.

Referring to FIGS. 8(a) and (b), the heads A2 and B2 are disposed to be apart by 180° +F. from the heads A1 and B1, respectively. With this arrangement, the signals recorded by the heads A2 and B2 are shifted by α+F from the signals recorded by the heads A1 and B2, respectively, on the magnetic tape 1. In the track pattern shown in FIG. 5(a), the head shift amount F is selected to correspond to 0.5 H.

FIG. 9 shows still another embodiment of a tape recorder of the invention for realizing the track pattern shown in FIG. 5(b) with the head arrangement shown in FIG. 3. The configuration of FIG. 9 is different from that of FIG. 7 in that the combined signals P1 and Q1 are applied to the rotary transformers 10a and 10b, respectively, and on the other hand delayed by 1.5H by delay circuits 17 and 18 to become combined signals P2 and Q2, respectively, as shown in FIG. 6, which signals P2 and Q2 are applied to the rotary transformers 10c and 10d, respectively. The signals P1 and Q1 are respectively recorded by the first pair of magnetic heads A1 and B1 during the first field in each frame, and the delayed signals P2 and Q2 are respectively recorded by the second pair of magnetic heads A2 and B2 during the second field in each frame.

FIG. 10 shows a further example of signal track pattern according to the invention, in which the combined signals P and Q supplied to the magnetic heads are exchanged with each other every frame. This track pattern can be realized by providing another switching circuit for switching the connection between the switch circuit 7 and the rotary transformers at intervals of a frame.

FIG. 11 shows an example of the field discrimination circuit 8 used in the embodiments of FIGS. 7 and 9. A monostable multivibrator (MM) 81 extracts horizontal syrchronizing signals from the composite synchronizing signals. A circuit composed of flip-flops 82, 83 and 84 discriminates the timing at which each vertical synchronizing signal starts by using both the rising and falling edges of the output of the MM 81, thereby producing at the Q output terminal of the flip-flop 84 the field discriminating signal. The field discrimination circuit 8 can be easily configured in various ways by known art other than the one shown in FIG. 11.

What is claimed is:

1. A video tape recorder for recording on a magnetic tape a video signal composed of a first signal having luminance signal information and a second signal having chrominance signal information, which comprises:
   means for exchanging said first signal and said second signal every predetermined period L to obtain two combined signals each composed of said first signal and said second signal which occur alternately at intervals of L;
   means having two pairs of rotary magnetic heads for recording said two combined signals on a magnetic tape so as to form signal tracks with no spaces between each adjacent two of said signal tracks, two heads of each of said pairs being disposed to be apart by a predetermined distance S in a rotating direction of said heads; and means for moving said magnetic tape so that a signal track of one field is shifted from a signal track of next field by a predetermined distance α, wherein said period L, said distance S and said distance α are selected as follows:

$L = kH;$ $S = (2n-1)L;$ and $\alpha = (i/2)L,$ where H denotes a horizontal scanning period and each of k, n and i denotes an arbitrary integer, whereby said first signal and said second signal recorded on each signal track are respectively adjacent to said first signal and said second signal recorded on each adjacent signal track which is adjacent to said each signal track.

2. The video tape recorder according to claim 1, wherein i=2m where m denotes an arbitrary integer, and wherein a second pair of said two pairs of rotary magnetic heads are shifted by a predetermined distance in said rotating direction from a position apart by 180° from a first pair of said two pairs of rotary magnetic heads so that said combined signals recorded on signal tracks of a second field in each frame by said second pair of rotary magnetic heads are shifted by a specified time from said combined signals recorded on signal tracks of a first field in said each frame by said first pair of rotary magnetic heads.

3. The video tape recorder according to claim 2, wherein said means for exchanging said first and second signals initializes a timing for exchanging said first and second signals every frame so that said first and second signals are recorded in a same order in every frame.

4. The video tape recorder according to claim 1, wherein i=2m where m denotes an arbitrary integer, and wherein said video tape recorder further comprises delay means for delaying said two combined signals respectively by a specified time, said two combined signals being recorded on signal tracks of a first field in each frame, the delayed two combined signals being recorded on signal tracks of a second field in said each frame.

5. The video tape recorder according to claim 4, wherein said means for exchanging said first and second signals initializes a timing for exchanging said first and second signals every frame so that said first and second signals are recorded in a same order in every frame.

6. The video tape recorder according to claim 1, wherein each two rotary magnetic heads among said two pairs of rotary magnetic heads for recording each adjacent two of said signal tracks are different in azimuth from each other.

7. The video tape recorder according to claim 1, wherein said first signal is a frequency-modulated luminance signal, and said second signal is a signal which is obtained by time-base-compression-multiplexing two chrominance difference signals and frequency-modulating the multiplexed signal.

8. The video tape recorder according to claim 1, wherein said first signal is a frequency-modulated luminance signal, and said second signal is a signal which is obtained by frequency-modulating two chrominacne difference signals with different carrier frequencies and mixing the frequency-modulated signals.

9. The video tape recorder according to claim 1, wherein said first signal is a frequency-modulated luminance signal, and said second signal is a signal which is obtained by frequency-modulating a line sequential chrominance difference signal.

* * * * *